United States Patent [19]

Worms

[11] Patent Number: 4,679,985
[45] Date of Patent: Jul. 14, 1987

[54] ENERGY CONVERTER

[76] Inventor: Louis Worms, Fruithoflaan 107-8b Box 114, B-2600 Berchem, Belgium

[21] Appl. No.: 740,068
[22] PCT Filed: Sep. 17, 1984
[86] PCT No.: PCT/NL84/00031
  § 371 Date: May 10, 1985
  § 102(e) Date: May 10, 1985
[87] PCT Pub. No.: WO85/01325
  PCT Pub. Date: Mar. 28, 1985

[30] Foreign Application Priority Data

Sep. 16, 1983 [BE] Belgium ............... 2/60204

[51] Int. Cl.⁴ .................................. F03D 3/00
[52] U.S. Cl. .............................. 416/119; 416/140
[58] Field of Search ............ 416/119, 197 A, 140

[56] References Cited

U.S. PATENT DOCUMENTS

| | | | |
|---|---|---|---|
| 3,804 | 10/1844 | Robinson | 416/119 |
| 110,683 | 1/1871 | Savoral | 416/119 |
| 440,266 | 11/1890 | Meredith | 416/119 |
| 505,736 | 9/1893 | Walker | 416/119 |
| 611,874 | 10/1898 | Turner | 416/132 B |
| 830,917 | 9/1906 | McNeil | 416/119 |
| 1,074,059 | 9/1913 | Wolfe | 416/119 |
| 1,076,713 | 10/1913 | Southwick | 416/119 |
| 1,373,456 | 4/1921 | Smith | 415/2 R X |
| 1,536,968 | 5/1925 | Palm | 416/119 |
| 1,772,119 | 8/1930 | Van Lammeren | 416/119 |
| 2,379,324 | 6/1945 | Topalov | 416/119 |
| 3,912,937 | 10/1975 | Lesser | 416/119 X |
| 4,383,797 | 5/1983 | Lee et al. | 415/7 |
| 4,408,956 | 10/1983 | Price | 416/119 |
| 4,496,283 | 1/1985 | Kodric | 416/119 X |

FOREIGN PATENT DOCUMENTS

| | | | |
|---|---|---|---|
| 138437 | 2/1903 | Fed. Rep. of Germany | 416/119 |
| 426626 | 7/1911 | France | 416/119 |
| 537312 | 5/1922 | France | 416/197 A |
| 582404 | 12/1924 | France | 416/119 |
| 586270 | 3/1925 | France | 416/119 |
| 613455 | 11/1926 | France . | |
| 2489429 | 3/1982 | France | 416/119 |
| 84132 | 7/1920 | Switzerland . | |
| 632807 | 10/1982 | Switzerland . | |
| 15646 | of 1892 | United Kingdom | 416/119 |
| 1508796 | 4/1978 | United Kingdom . | |
| 2048391 | 12/1980 | United Kingdom | 416/132 B |

Primary Examiner—Everette A. Powell, Jr.
Attorney, Agent, or Firm—Roylance, Abrams, Berdo & Goodman

[57] ABSTRACT

The energy converter includes a frame, a rotor mounted in the frame with a rotor shaft and vanes, and an element that can connect the rotor shaft to a generator, an alternator or another energy-converting mechanism. Each vane has a holder, a plurality of blades which hinge in the holder about small axes which lie in parallel relationship with the rotor shaft, and stops for the blades. The blades are a plurality of leaves which hinge on one another about axes which lie in parallel relationship with the rotor shaft. Stops limit the relative hinging motion of the leaves on the one hand to the position where they lie in extension of one another, and on the other hand to a position where the leaves form angles, for example in the range of 135°.

5 Claims, 4 Drawing Figures

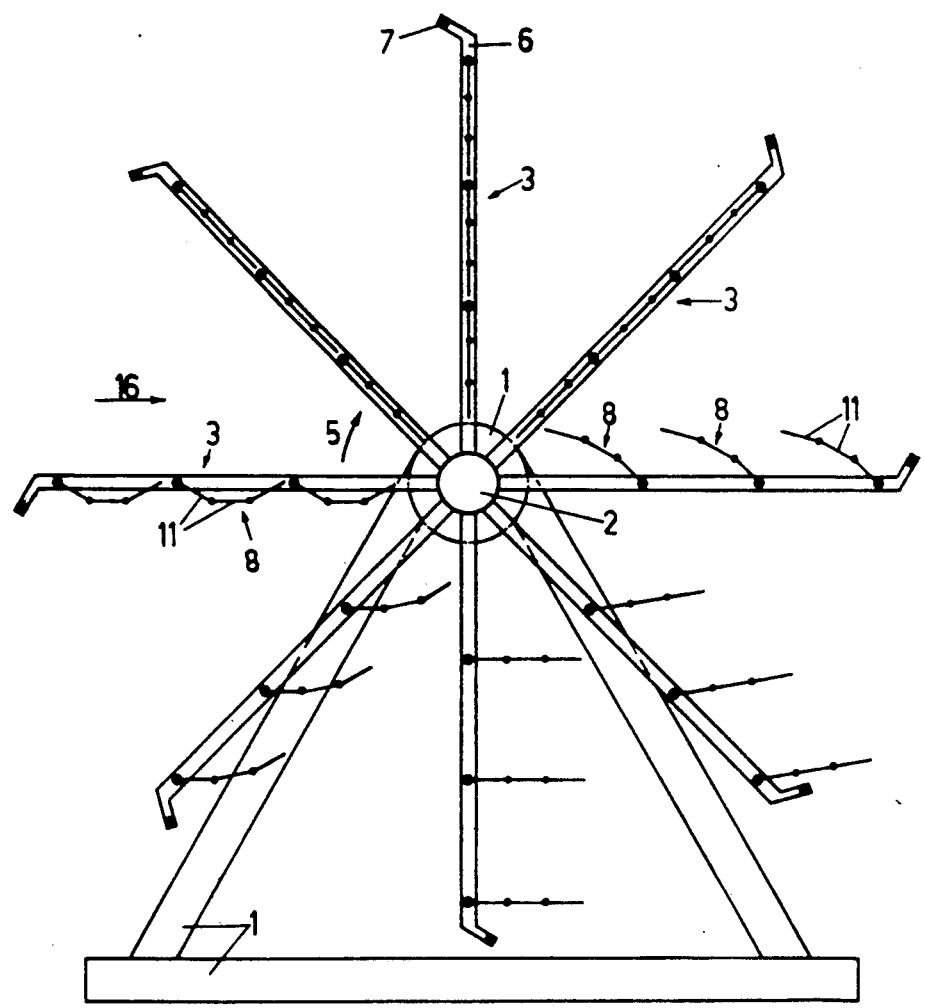

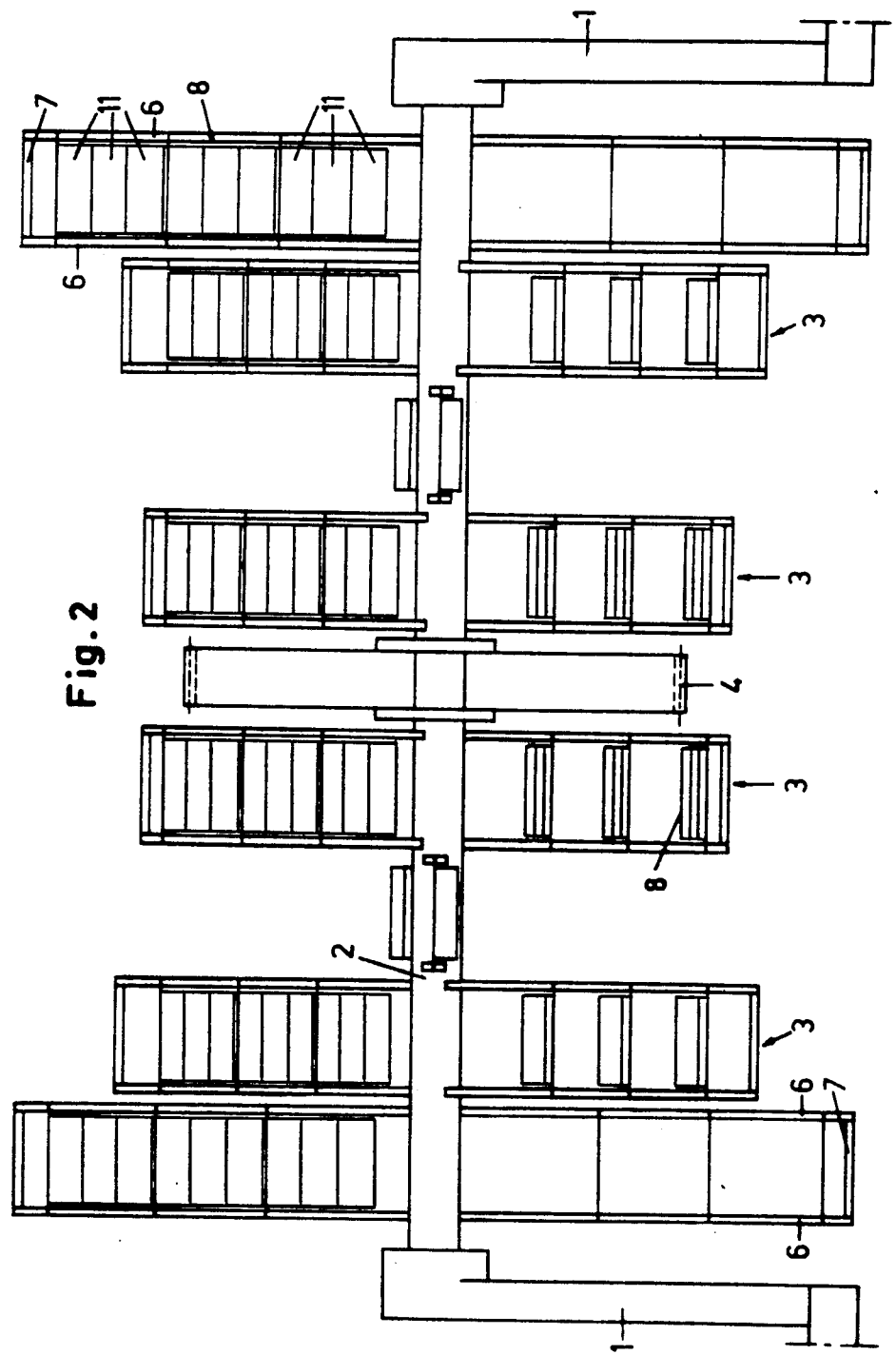

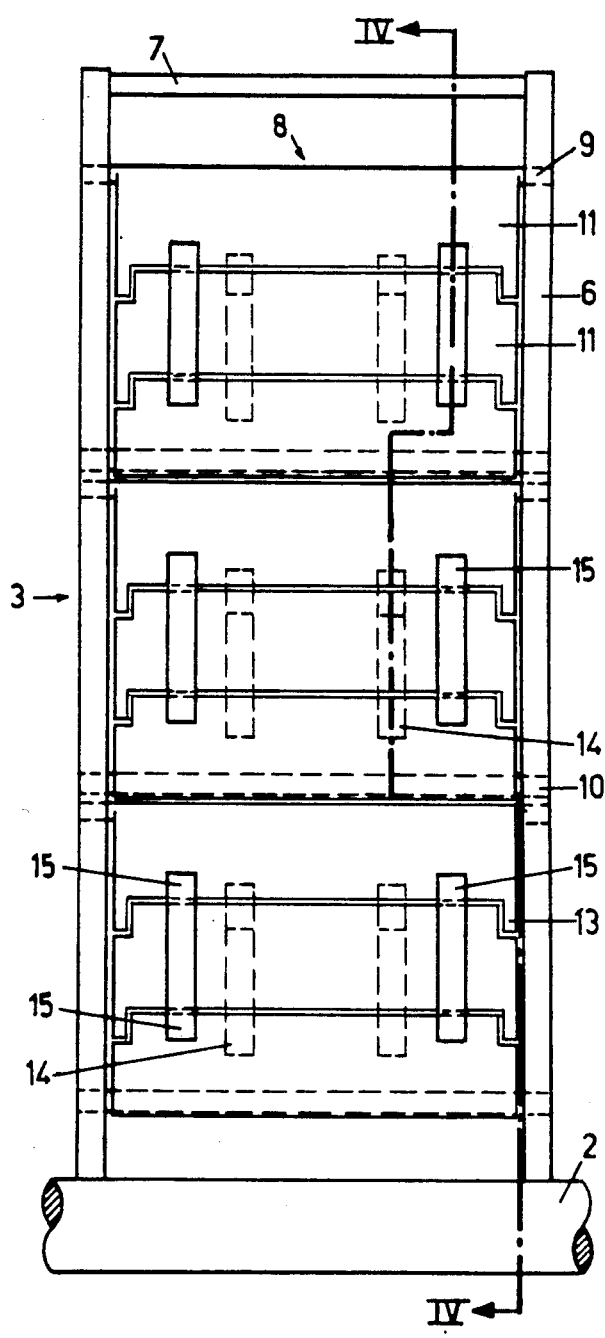
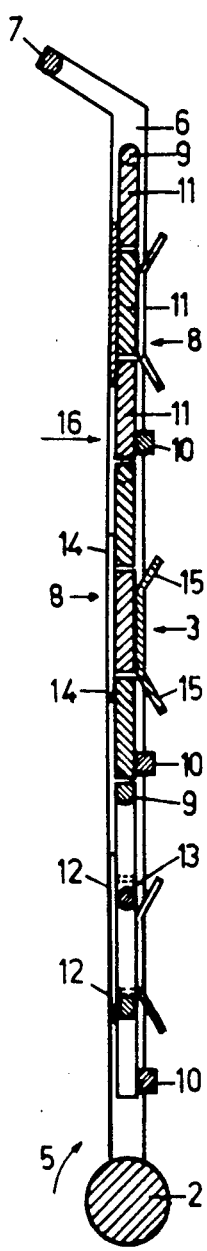

ENERGY CONVERTER

TECHNICAL AREA AND BACKGROUND

The invention relates to an energy converter comprised of
a frame
a rotor mounted in said frame, which rotor is comprised of
a rotor shaft and
vanes which each define a main vane plane which comprises the rotor shaft, each of said vanes being comprised of
a holder which is fast to the rotor shaft
at least one blade which hinges relative to the holder about a hinge axis which lies in parallel relationship with the rotor shaft, and
a stop for said blade which is fast to the holder and lies substantially in the main vane plane, and
an element which can connect the rotor shaft to an energy-converting mechanism.

The energy-converting mechanism is for example an electricity-generating mechanism, particularly an alternator or generator.

The energy converter receives energy through the rotor thereof, from a flow and conveys said energy through the rotor shaft to the energy-converting mechanism comprised for example of an alternator or generator.

In the known energy-convertors of this kind, said blade is comprised of a single leaf. Said known energy-convertors cannot always pick-up enough power from the flow, especially when said flow has a limited speed.

An object of the invention lies in providing an energy-converter of the above-defined type which picks-up enough power from the flow even when said flow has a limited speed.

Another object of the invention is to provide an energy-converter of said kind for which the ratio between that energy which is conveyed to the converting mechanism on the one hand, and the energy available in the flow on the other hand, is higher than in the energy-convertors according to the prior art.

THE INVENTION

For this purpose, said blade of each vane is comprised of at least two leaves which hinge relative to one another about a small axis which lies in parallel relationship with the rotor shaft and means are provided which as said leaves lie in extension of one another and the blade engages the stop, make impossible the further mutual hinging movement of the leaves in the direction which brings the axis about which the leaves hinge relative to one another, past that plane which is defined by the stop and the hinge axis of the blade relative to the holder.

Although other arrangements are not excluded, the energy converter according to the invention is however preferably so arranged as to have the rotor thereof lying completely under water, the rotor shaft at least substantially horizontal and at right angle to the flow direction, and the blades that lie above the rotor shaft being pressed by the flow against the stop thereof.

In a particular embodiment of the invention, the means are comprised of at least one stop on a leaf which the adjacent leaf meets.

In an efficient embodiment of the invention, the blade of each vane is comprised of three leaves, a middle one of which is hingedly connected to both adjacent leaves.

The leaves are preferably also provided with means which limit the mutual hinging movement thereof in the opposite direction to the above-defined direction.

In another embodiment of the invention, each vane comprises a plurality of blades which each hinge relative to a holder and are comprised of at least two leaves.

The efficiency of the energy converter according to the invention is advantageously influenced when the main vane planes of at least a number of adjacent differently axially-arranged vanes form an angle.

The vanes are then preferably arranged by pairs both vanes of which have the same axial position and a common main vane plane, but lie on different sides of the rotor shaft.

Usefully the rotor shaft then bears two symmetrically-located series of vane pairs and each series is comprised of n vane pairs the adjacent pairs of which form angles of 180°/n.

Other features and advantages of the invention will stand out from the following description of an energy converter according to the invention; this description is only given by way of example and does not limit the invention; the reference numerals pertain to the accompanying drawings.

THE DRAWINGS

FIG. 1 is a diagrammatic side view of an energy converter according to the invention.

FIG. 2 is a diagrammatic front view of the energy converter as shown in FIG. 1.

FIG. 3 shows again, on a larger scale and with more details, part of FIG. 2.

FIG. 4 shows a cross-section along line IV—IV in FIG. 3.

In the various figures, the same reference numerals pertain to the same elements.

EXAMPLE OF EMBODIMENT

The energy converter as shown in the figures mainly comprises a frame 1, a rotor mounted therein, which is comprised of a shaft 2 and two series vanes 3, and a gear wheel 4 which is secured between both vane series 3 on shaft 2 and which is part of a connection between said shaft 2 and an energy-converting mechanism. Said connection is known per se and is for example a gear transmission. For clearness' sake, but gear wheel 4 of said connection has been shown.

The energy-converting mechanism also is known per se. Said mechanism is preferably a mechanism which converts a revolution into an electric energy, for example an alternator or generator. For clearness' sake also said mechanism has not been shown either.

The unit as shown in the figures is arranged completely under water in a stream. The shaft 2 supported in frame 1 is directed cross-wise to the flow direction of the water. The arrangement is preferably such as to have the shaft 2 horizontal. Such an arrangement is shown in the figures. The shaft might however also be located vertically and might also form some angle with the horizontal plane.

Each vane series is comprised of eight vanes 3 which are arranged by pairs diametrically opposite one another and thus form four pairs which lie completely next to one another in the axial direction of shaft 2. The two vanes 3 of one and the same pair thus have the same axial position and a common main vane plane, but lie on different sides of rotor shaft 2. The four pairs of one and the same series, as considered from the outermost pair towards the innermost pair, are each displaced over 180°/4 or 45° relative to one another in the rotation direction of the rotor, which rotation direction is shown in FIGS. 1 and 4 by arrow 5.

The two series are symmetrical to one another relative to gear wheel 4. When each series comprises four vane pairs, the rotor bears a total of sixteen vanes 3.

Each vane 3 comprises two spokes 6 which extend mainly radially relative to rotor shaft 2 and lie at a distance from one another in the axial direction. The two spokes 6 thus define a main vane plane. Those ends removed from rotor shaft 2 of both spokes 6 are however bent over about 45° in the backwards direction relative to the rotation direction of rotor shaft 2. Said ends thus form an angle of 135° with the remaining portion of the spokes 6.

Said spokes are joined together by a connecting rod 7. Said connecting rod 7 forms together with both spokes 6, a holder for three blades 8.

Each one of said blades 8 is hingedly secured with the side thereof removed from shaft 2, to the spokes 6 by means of two pins 9 which are supported in the two spokes 6. The two pins 9 form a hinge axis about which the blade 8 hinges relative to the spokes 6. Said axis lies in parallel relationship with rotor shaft 2.

A support 10 is secured on the spokes 6 for each blade 8. Said support 10 lies in parallel relationship with rotor shaft 2, lies in front of blade 8 relative to that rotation direction as shown by arrow 5 of rotor shaft 2 and actually opposite the edge of blade 8 facing the rotor shaft 2 when said blade 8 lies in the main vane plane.

In working position the blade 8 lies essentially against support 10 in the main vane plane, which support forms a stop for the blade and lies approximately in the main vane plane. The blades 8 cannot hinge past the spokes 6 which form the bearers thereof, as this is prevented by the stops 10. In the reverse direction, thus away from the stops 10, said blades may however swing freely about the pins 9, thus lagging relative to the swinging of the spokes 6 which are fixedly carried along with the rotor shaft 2. In FIG. 1, the blades 8 of those vanes 3 which lie above the rotor shaft 2, have been shown in the main vane plane, and the blades 8 of the other vanes have been shown in a position wherein they lag in the holders thereof.

It is to be noted that when a blade 8 lags relative to the holder 6 which bears same, said blade 8 hinges about the hinge axis 9 thereof in the direction of arrow 5, that is in that direction along which said rotor shaft 2 rotates.

The blade 8 of each vane 3 which lies farthest away from the rotor shaft, may only lag over about 120° relative to the holder 6 thereof as a further relative movement of said blade 8 relative to the spokes 6 in this lagging direction is prevented due to the connecting rod 7 which forms a second stop for said blade.

Each blade 8 is comprised of three leaves 11 which are hingedly secured to one another. THe outermost leaf 11 is rotatably secured by the pins 9 to the spokes 6. The middle leaf 11 is provided on the outermost edge thereof with two pins 12 which are supported in projections 13 of the outermost leaf 11, while the innermost leaf 11 is provided on the outermost edge thereof also with two pins 12 which are supported in projections 13 of the middle leaf 11.

The pins 12 of the leaves 11 are so directed as to have the geometrical axes defined by said pins and about which the leaves 11 hinge relative to one another, lie in parallel relationship with rotor shaft 2.

The relative rotation of the three leaves 11 of each blade 8 is however limited on the one hand by stops 14, and on the other hand by stops 15.

The stops 14 and 15 are secured to the middle leaf 11, respectively on the back and the front side of said leaf in the rotation direction of rotor shaft 2 as shown by arrow 5.

As it appears mostly from FIGS. 3 and 4, the stops 14 are the ends of two straight strips which are directed cross-wise to the rotation axes of the leaves and so secured on the back of the middle leaf 11 as to project on either side outside said leaf.

Said stops 14 prevent buckling of the blade 8 backwards relative to the rotation direction of rotor shaft 2 as shown by arrow 5, due to a relative rotation of the leaves 11 relative to that position whereby said leaves 11 are lying in the extension of one another.

In the position as shown in FIGS. 3 and 4, the leaves 11 lie in the extension of one another because they lie in the main vane plane; the blade 8 then engages with the edge lying closest to rotor shaft 2 of the innermost leaf, the support 10.

The bending of the blade 8 in reverse direction due to a relative swinging of the leaves 11 thereof is possible in a limited measure. The stops 15 are formed by the ends projecting outside the middle leaf 11 of two strips which are secured to the front side of said middle leaf 11, but said ends do not lie in parallel relationship with the plane of the middle leaf 11, but are directed frontwards at an angle of about 45°.

There results therefrom that the middle leaf can swing approximately over 45° relative to the outermost leaf 11 in the opposite direction to the rotation direction of rotor shaft 2 as shown by arrow 5, while the innermost leaf 11 can swing in turn over about 45° in the same opposite direction relative to the middle leaf 11.

When the vane 3 lies above the rotor shaft 2, crosswise to the flow direction of the water, which is shown in FIGS. 1 and 4 by arrow 16, the leaves 11 of each blade 8 of this vane 3 lie in extension of one another, against the stops 14. The blades 8 lie in the main vane plane against the stops 10.

When the vane 3 during the downwards movement thereof nears that position where it does extend along the flow direction of the water, the blades 8 lag somewhat on the rotation of the rotor shaft and consequently on the movement of the spokes 6. The blade 8 as a whole is released from the stop 10 and performs a limited swinging movement about the hinge axis 9 thereof in the same direction as the rotation direction of rotor shaft 2 as shown by arrow 5. Simultaneously, the outermost and innermost leaves 11 of each blade 8 are released from the stops 14 on the middle leaf and the leaves 11 hinge relative to one another until the outermost and innermost leaves engage the stops 15 on the middle leaf. As it appears from the right-hand part of FIG. 1 level with rotor shaft 2, the blades 8 still remain, at least by approximation, directed in the opposite direction to the flow direction 16 of the water, but they remain as a whole somewhat lagging on the main vane plane.

When the vane has come below the level of rotor shaft, the blades 8 perform a further swinging movement about the axes 9 thereof, still in the rotation direction as shown by arrow 5, until they extend completely flat in the water flow direction as shown by arrow 16. The innermost and outermost leaves 11 now hinge in the opposite direction relative to the middle leaf so that they are released from the stops 15 and engage again the stops 14, and the three leaves 11 of one and the same blade 3 lie again in extension of one another.

On some specific moment, the blades 8 lie at an angle markedly larger then 90° to the main plane of vane 3. The outwards rotation of the outermost-lying blade 8 is limited to an angle of about 135° relative to the main vane plane by the connecting rod 7 which forms a stop.

When the vane 3 moves further in the opposite direction to the water flow direction as shown by arrow 16 and thereafter moves again upwards, the blades 8 remain behind the main vane plane relative to the rotation direction of rotor shaft 2.

As soon as vane 3 has returned above shaft 2, the deflection between the blades 8 and the main vane plane is canceled by the push of the water, and the leaves 11 are pressed against the stops 14, in extension of one another.

The above-described energy converter has a very high efficiency.

The invention is in no way limited to the above-described embodiment, and within the scope of the patent application, many changes may be brought to the described embodiment, notably as regards the shape, the arrangement, the composition and the number of the components which are being used for embodying the invention.

Particularly, the number of vanes does not necessarily have to be sixteen. Different vane series do not necessarily have to be provided either. One series is enough.

The connection between the rotor shaft and the energy-converting mechanism does not have necessarily to comprise a gear wheel on the shaft. The element made fast to the shaft is dependent on the connection proper and may notably also be a chain wheel or a belt pulley.

The blade stops do not necessarily have to be formed by a discrete part secured to the holder. For the blades to the exception of the innermost blade, the stop may be formed by the outermost edge of the adjacent more inwardly-lying blade, in which case said blades overlap somewhat one another when they lie in the main vane plane.

I claim:

1. An energy converter, comprising:
   a frame;
   a rotor mounted in said frame and including
     a rotor shaft, and
     a plurality of vanes, each of said vanes having two parallel spokes defining a main vane plane passing through the shaft,
   a plurality of blades, each of said blades having
     a middle leaf, a first adjacent leaf and second adjacent leaf,
     first means connecting said middle leaf to said first adjacent leaf and to said second adjacent leaf about first geometrical axes parallel to said shaft, and
     second means comprising stops secured to each middle leaf limiting in a first direction the relative hinging of said middle leaf to said first adjacent leaf and the relative hinging of said second adjacent leaf to said middle leaf about said first geometrical axes up to a position wherein said first adjacent leaf, said middle leaf and said second adjacent leaf extend in a single plane,
   third means for each of said blades connecting hingedly the first adjacent leaf to said spokes about a second geometrical axis parallel to said shaft, the blades thus hinging relative to said spokes about said second geometrical axis, and
   stops on said spokes for each of said blades limiting, in a second direction opposite to said first direction, the relative hinging of said blades about said second geometrical axis; and
   an element for connecting the rotor shaft to an energy-converting mechanism.

2. The energy converter of claim 1 wherein each of said blades comprises fourth means for limiting in said second direction opposite to said first direction, the relative hinging of said middle leaf to said first adjacent leaf and the relative hinging of said second adjacent leaf to said middle leaf about said first geometrical axes, said fourth means comprising stops secured to each middle leaf.

3. The energy converter of claim 2 wherein said stops of said second and fourth means comprise plates extending from said middle leaves.

4. The energy converter of claim 3 wherein said plates of said second means are planar; and said plates of said fourth means have angled portions.

5. An energy converter, comprising:
   a frame;
   a rotor mounted in said frame and including
     a rotor shaft, and
     a plurality of vanes, each of said vanes having two parallel spokes defining a main vane plane passing through the shaft,
   a plurality of blades, each of said blades having
     a first leaf, a second leaf and a third leaf,
     first means connecting said first leaf to said second leaf and said second leaf to said third leaf about first geometrical axes parallel to said shaft, and
     second means comprising stops secured to at least one of said first leaf, said second leaf and said third leaf limiting in a first direction the relative hinging of said second leaf to said first leaf and the relative hinging of said third leaf to said second leaf about said first geometrical axes up to a position wherein said first leaf, said second leaf and said third leaf extend in a single plane,
   third means for each of said blades connecting hingedly the first leaf to said spokes about a second geometrical axis parallel to said shaft, the blades thus hinging relative to said spokes about said second geometrical axis,
   stops on said spokes for each of said blades limiting, in a second direction opposite to said first direction, the relative hinging of said blades about said second geometrical axis; and
   an element for connecting the rotor shaft to an energy-converting mechanism.

* * * * *